United States Patent
Li et al.

(10) Patent No.: US 12,506,155 B2
(45) Date of Patent: Dec. 23, 2025

(54) ELECTRODE ASSEMBLY, BATTERY CELL, BATTERY, AND METHOD AND DEVICE FOR MANUFACTURING ELECTRODE ASSEMBLY

(71) Applicant: CONTEMPORARY AMPEREX TECHNOLOGY (HONG KONG) LIMITED, Hong Kong (CN)

(72) Inventors: Baiqing Li, Ningde (CN); Cheng Ji, Ningde (CN); Haizu Jin, Ningde (CN); Kai Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 533 days.

(21) Appl. No.: 18/194,658

(22) Filed: Apr. 3, 2023

(65) Prior Publication Data
US 2023/0238540 A1    Jul. 27, 2023

Related U.S. Application Data

(63) Continuation of application No. PCT/CN2021/089322, filed on Apr. 23, 2021.

(51) Int. Cl.
*H01M 4/62* (2006.01)
*H01M 4/02* (2006.01)
(Continued)

(52) U.S. Cl.
CPC ......... *H01M 4/628* (2013.01); *H01M 50/103* (2021.01); *H01M 50/538* (2021.01); *H01M 2004/028* (2013.01)

(58) Field of Classification Search
CPC .. H01M 4/628; H01M 50/103; H01M 50/538; H01M 2004/028; H01M 4/0404;
(Continued)

(56) References Cited

U.S. PATENT DOCUMENTS

2019/0386344 A1* 12/2019 Kasamatsu ........... H01M 10/05

FOREIGN PATENT DOCUMENTS

CN    101150183 A    3/2008
CN    102683739 A    9/2012
(Continued)

OTHER PUBLICATIONS

The Notice of Registration received in the counterpart CN application 202180051513.3, dated Jun. 30, 2025, 7 pages with English translation.
(Continued)

*Primary Examiner* — Matthew T Martin
*Assistant Examiner* — Bartholomew A Hornsby
(74) *Attorney, Agent, or Firm* — K&L Gates LLP

(57) ABSTRACT

An electrode assembly, a battery cell, a battery, and a method and device for manufacturing an electrode assembly are provided. In some embodiments, the electrode assembly includes a positive electrode plate and a negative electrode plate. The positive electrode plate and the negative electrode plate are wound or folded to form a bend region. The positive electrode plate includes a plurality of bend portions located in the bend region. Each bend portion includes a positive current collecting layer and a positive active material layer. The positive current collecting layer is coated with the positive active material layer on at least one surface in a thickness direction of the positive electrode plate. A barrier layer is disposed between the positive current collecting layer and the positive active material layer.

12 Claims, 10 Drawing Sheets

(51) Int. Cl.
*H01M 50/103* (2021.01)
*H01M 50/538* (2021.01)

(58) Field of Classification Search
CPC ...... H01M 4/13; H01M 4/667; H01M 10/052; H01M 10/0583; H01M 10/0587; H01M 10/4235; H01M 50/571; H01M 10/0431; H01M 10/045; Y02E 60/10; Y02P 70/50
See application file for complete search history.

(56) References Cited

FOREIGN PATENT DOCUMENTS

| | | | |
|---|---|---|---|
| CN | 105917513 | A | 8/2016 |
| CN | 205992575 | U | 3/2017 |
| CN | 108134128 | A | 6/2018 |
| CN | 108666533 | A | 10/2018 |
| CN | 110400933 | A | 11/2019 |
| CN | 212810367 | U | 3/2021 |
| EP | 3979372 | A1 | 4/2022 |
| EP | 4064405 | A1 | 9/2022 |
| JP | 2015130246 | A | 7/2015 |
| WO | 2021023134 | A1 | 2/2021 |
| WO | 2022036721 | A1 | 2/2022 |

OTHER PUBLICATIONS

International Search Report received in the corresponding International Application PCT/CN2021/089322, mailed Jan. 13, 2022.
Extended European Search Report received in the corresponding European Application 21921626.4, mailed Mar. 30, 2023.

\* cited by examiner

ELECTRODE ASSEMBLY, BATTERY CELL, BATTERY, AND METHOD AND DEVICE FOR MANUFACTURING ELECTRODE ASSEMBLY

CROSS-REFERENCE TO RELATED APPLICATIONS

This application is a continuation of International Application PCT/CN2021/089322, filed Apr. 23, 2021, and entitled "ELECTRODE ASSEMBLY, BATTERY CELL, BATTERY, AND METHOD AND DEVICE FOR MANUFACTURING ELECTRODE ASSEMBLY", which is incorporated herein by reference in its entity.

TECHNICAL FIELD

This disclosure relates to the field of batteries, and in particular, to an electrode assembly, a battery cell, a battery, and a method and device for manufacturing an electrode assembly.

BACKGROUND

With the rapid development of smartphones, tablet computers, and electric vehicles, lithium-ion batteries are used more widely, and accordingly, higher requirements are posed on the lithium batteries. People expect higher electrical performance of a lithium battery in addition to safety performance of the battery. Lithium plating is one of main factors affecting the electrical performance and safety performance of the battery. Once lithium plating occurs in the battery, not only the electrical performance of the battery will deteriorate, but also dendrites are prone to take shape with the accumulation of lithium precipitated. The dendrites are prone to puncture the separator, cause an internal short circuit in the battery, and result in a safety hazard.

Therefore, how to effectively avoid or reduce the risks of lithium plating in the battery has become an urgent technical problem currently.

SUMMARY

This disclosure provides an electrode assembly, a battery cell, a battery, and a manufacturing method and device to alleviate or avoid lithium plating and improve battery safety.

According to a first aspect, an embodiment in accordance with this disclosure provides an electrode assembly, including: a positive electrode plate and a negative electrode plate. The positive electrode plate and the negative electrode plate are wound or folded to form a bend region.

The positive electrode plate includes a plurality of bend portions located in the bend region. Each bend portion includes a positive current collecting layer and a positive active material layer. The positive current collecting layer is coated with the positive active material layer on at least one surface in a thickness direction of the positive electrode plate.

A barrier layer is disposed between the positive current collecting layer and the positive active material layer. The barrier layer is configured to prevent electron transport between the positive current collecting layer and the positive active material layer.

In the foregoing technical solution, the barrier layer is disposed between the positive current collecting layer and the positive active material layer of the bend portion. The barrier layer can prevent electron transport between the positive current collecting layer and the positive active material layer, thereby weakening or precluding delithiation reactions of the positive active material layer of the positive electrode plate at the bend portion. Even if a negative active material falls off from the bend portion of the negative electrode plate, because no lithium ions or just a small quantity of lithium ions need to be intercalated, the probability of lithium plating is reduced, or occurrence of lithium plating is avoided, thereby improving battery safety.

In some embodiments, the positive current collecting layer is coated with the positive active material layer on an inner side of the positive current collecting layer in the thickness direction. The barrier layer is disposed between the positive active material layer located on the inner side and the positive current collecting layer in at least one bend portion.

In the foregoing technical solution, the barrier layer is disposed between the positive active material layer located on the inner side and the positive current collecting layer in at least one bend portion. The barrier layer can prevent electron transport between the positive current collecting layer and the positive active material layer located on the inner side of the positive current collecting layer, and alleviate lithium plating of a negative active material layer on an outer side in the negative electrode plate.

In some embodiments, the positive active material layer is coated on the outer side of the positive current collecting layer in the thickness direction. The barrier layer is disposed between the positive active material layer located on the outer side and the positive current collecting layer in at least one bend portion.

In the foregoing technical solution, the barrier layer is disposed between the positive active material layer located on the outer side and the positive current collecting layer in at least one bend portion. The barrier layer can prevent electron transport between the positive current collecting layer and the positive active material layer on the outer side of the positive current collecting layer, and alleviate lithium plating of the negative active material layer of the negative electrode plate on the inner side.

In some embodiments, the positive current collecting layer is coated with the positive active material layer on both the inner side and the outer side in the thickness direction. The barrier layer is disposed between the positive active material layer located on the inner side and the positive current collecting layer, and between the positive active material layer located on the outer side and the positive current collecting layer, in at least one bend portion.

In the foregoing technical solution, the barrier layer is disposed between the positive active material layer located on the inner side and the positive current collecting layer, and between the positive active material layer located on the outer side and the positive current collecting layer, in at least one bend portion. The barrier layer can prevent electron transport between the positive active material layer located on the outer side of the positive current collecting layer and the positive current collecting layer, and prevent electron transport between the positive active material layer located on the inner side of the positive current collecting layer and the positive current collecting layer, thereby alleviating lithium plating of the negative active material layer on both the inner side and the outer side in the negative electrode plate.

In some embodiments, the positive electrode plate and the negative electrode plate are wound to form a jelly-roll structure. The jelly-roll structure includes a bend region.

An innermost electrode plate in the bend region is a negative electrode plate, and the barrier layer is disposed in an innermost bend portion of the bend region.

At a section closer to the inside, the section of the negative electrode plate in the bend region is bent to a greater extent, and detachment of coating is severer than other sections, and lithium plating is more likely to occur. In the foregoing technical solution, the barrier layer is disposed in the innermost bend portion of the bend region. The barrier layer can prevent transport of at least a part of electrons between the innermost positive current collecting layer and the positive active material layer, and reduce occurrence of the lithium plating at the inner part of the negative electrode plate in the bend region.

In some embodiments, both ends of the barrier layer extending along a bending direction of the bend portion are located in the bend region.

In the foregoing technical solution, the entire barrier layer is located in the bend region, thereby alleviating or avoiding an impact caused by the barrier layer to a part that is of the positive electrode plate and that is located outside the bend region.

In some embodiments, the electrode assembly includes a straight region connected to the bend region.

Both ends of the barrier layer extending along a bending direction of the bend portion are located in the straight region, or, one end of the barrier layer extending along a bending direction of the bend portion is located in the straight region, and the other end is located in the bend region.

In the foregoing technical solution, a relatively large quantity of electrons can be prevented from being transported between the positive current collecting layer and the positive active material layer, thereby reducing occurrence of lithium plating.

In some embodiments, one end or two ends of the barrier layer extending along a first direction do not exceed the positive active material layer, the first direction being perpendicular to a bending direction of the bend region.

In the foregoing technical solution, some electrons can be prevented from being transported between the positive current collecting layer and the positive active material layer, and the occurrence of lithium plating is reduced. At the same time, a relatively high energy density of the electrode assembly is ensured.

In some embodiments, there are a plurality of discrete barrier layers. The plurality of barrier layers are spaced out along a bending direction of the bend region, or the plurality of the barrier layers are spaced out along a first direction. The first direction is perpendicular to the bending direction of the bend region.

In the foregoing technical solution, some electrons can be prevented from being transported between the positive current collecting layer and the positive active material layer, and the occurrence of lithium plating is reduced. At the same time, a relatively high energy density of the electrode assembly is ensured.

In some embodiments, one surface of the barrier layer is attached to the positive current collecting layer, and the other surface is attached to the positive active material layer.

In the foregoing technical solution, the barrier layer is firmly connected to the positive current collecting layer and the positive active material layer to alleviate or avoid dislocation of the barrier layer during use of the battery cell.

In some embodiments, the barrier layer is an insulation layer.

In the foregoing technical solution, due to a relatively high resistance, the insulation layer can thoroughly prevent electron transport between the positive current collecting layer and the positive active material layer, thereby reducing occurrence of lithium plating.

In some embodiments, the barrier layer includes at least one of an insulation adhesive layer, a ceramic insulation layer, or insulation tape.

In the foregoing technical solution, a combination of one or more of the insulation adhesive layer, the ceramic insulation layer, or the insulation tape can effectively prevent electron transport between the positive current collecting layer and the positive active material layer, thereby reducing occurrence of lithium plating.

In some embodiments, constituents of the insulation adhesive layer include at least one of styrene-butadiene rubber, polyacrylate, polyvinyl chloride, polyvinylidene difluoride, poly(vinylidene fluoride-co-hexafluoropropylene), epoxy resin, poly(butadiene-co-acrylonitrile), polyurethane rubber, polymethyl acrylate, or polyethyl acrylate.

In the foregoing technical solution, the insulation adhesive layer made of the foregoing constituents can effectively prevent electron transport between the positive current collecting layer and the positive active material layer, thereby reducing occurrence of lithium plating.

In some embodiments, two surfaces of the insulation adhesive layer are bonded to the positive current collecting layer and the positive active material layer respectively.

In the foregoing technical solution, the insulation adhesive layer is firmly connected to the positive current collecting layer and the positive active material layer to alleviate or avoid dislocation of the insulation adhesive layer during use of the battery cell.

In some embodiments, the ceramic insulation layer is a mixture of ceramic particles and a polymer binder. The ceramic particles include at least one of aluminum oxide, titanium oxide, barium sulfate, or zirconium oxide.

Constituents of the polymer binder include at least one of styrene-butadiene rubber, polyacrylate, polyvinyl chloride, polyvinylidene difluoride, poly(vinylidene fluoride-co-hexafluoropropylene), epoxy resin, poly(butadiene-co-acrylonitrile), polyurethane rubber, polymethyl acrylate, or polyethyl acrylate.

In the foregoing technical solution, the polymer binder can be bonded to the positive current collecting layer and the positive active material layer. The ceramic particles can prevent electron transport between the positive current collecting layer and the positive active material layer, thereby reducing occurrence of lithium plating.

In some embodiments, a substrate material of the insulation tape is polyethylene terephthalate, polyvinyl chloride, polyethylene, or oriented polypropylene.

The insulation tape made of the foregoing material can prevent electron transport between the positive current collecting layer and the positive active material layer, thereby reducing occurrence of lithium plating.

According to a second aspect, an embodiment of this disclosure provides a battery cell. The battery cell includes a shell and the electrode assembly described above.

The electrode assembly is accommodated in the shell.

According to a third aspect, an embodiment of this disclosure provides a battery, including a box and the battery cell described above.

The battery cell is accommodated in the box.

According to a fourth aspect, an embodiment of this disclosure provides an electrical device, including the battery described above.

According to a fifth aspect, an embodiment of this disclosure provides a method for manufacturing an electrode assembly. The manufacturing method includes:

provide a positive electrode plate, a negative electrode plate, and a barrier layer; and winding or folding the positive electrode plate and the negative electrode plate to form a bend region.

The positive electrode plate includes a plurality of bend portions located in the bend region. Each bend portion includes a positive current collecting layer and a positive active material layer. The positive current collecting layer is coated with the positive active material layer on at least one surface in a thickness direction of the positive electrode plate.

A barrier layer is disposed between the positive current collecting layer and the positive active material layer. The barrier layer is configured to prevent electron transport between the positive current collecting layer and the positive active material layer.

In some embodiments, the manufacturing method further includes: disposing the barrier layer between the positive current collecting layer on at least one surface of the positive electrode plate in the thickness direction of the positive electrode plate and the positive active material layer before winding or folding the positive electrode plate and the negative electrode plate.

In some embodiments, the method further includes: providing a separator configured to separate the positive electrode plate from the negative electrode plate, and winding or folding the positive electrode plate, the separator, and the negative electrode plate to form the bend region.

According to a sixth aspect, an embodiment of this disclosure provides a device for manufacturing an electrode assembly, including:

a first providing device, configured to provide a positive electrode plate;

a second providing device, configured to provide a negative electrode plate; and a third providing device, configured to provide a barrier layer; and an assembling device, configured to wind or fold the positive electrode plate and the negative electrode plate to form a bend region.

The positive electrode plate includes a plurality of bend portions located in the bend region. Each bend portion includes a positive current collecting layer and a positive active material layer. The positive current collecting layer is coated with the positive active material layer on at least one surface in a thickness direction of the positive electrode plate.

A barrier layer is disposed between the positive current collecting layer and the positive active material layer. The barrier layer is configured to prevent electron transport between the positive current collecting layer and the positive active material layer.

BRIEF DESCRIPTION OF DRAWINGS

To describe the technical solutions in the embodiments of this disclosure more clearly, the following outlines the drawings used in the embodiments of this disclosure. Evidently, the drawings outlined below are merely a part of embodiments of this disclosure. A person of ordinary skill in the art may derive other drawings from the outlined drawings without making any creative efforts.

Figure 1:
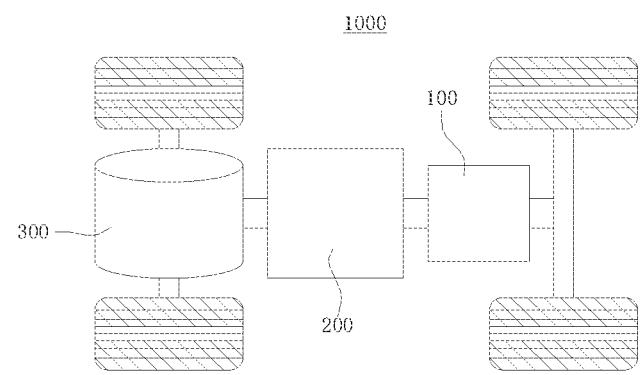
FIG. 1 is a schematic structural diagram of a vehicle according to some embodiments of this disclosure.

The drawings are not drawn to scale.

DETAILED DESCRIPTION OF EMBODIMENTS

The following gives a more detailed description of some example embodiments/implementations in accordance with this disclosure with reference to drawings. The detailed description of the following embodiments and the accompanying drawings are intended to exemplarily describe the principles of this disclosure, but not to limit the scope of this disclosure. Therefore, this disclosure is not limited to the described embodiments.

In the description of this disclosure, unless otherwise specified, "a plurality of" means at least two in number; the terms such as "up", "down", "left", "right", "in", and "out" indicating a direction or a position relationship are merely intended for ease or brevity of description of this disclosure, but do not indicate or imply that the mentioned apparatus or component is necessarily located in the specified direction or constructed or operated in the specified direction. Therefore, such terms are not to be understood as a limitation on this disclosure. In addition, the terms "first", "second", and "third" are merely intended for descriptive purposes, but are not intended to indicate or imply relative importance. "Perpendicular" does not means exact perpendicularity, but means perpendicularity falling within an error tolerance range. "Parallel" does not mean exact parallelism, but means parallelism falling within an error tolerance range.

The directional terms appearing in the following description indicate the directions shown in the drawings, but are not intended to limit specific structures in this disclosure. In the description of this disclosure, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this disclosure according to specific situations.

The term "and/or" in this disclosure indicates merely a relation for describing the related items, and represents three possible relationships. For example, "A and/or B" may represent the following three circumstances: A alone, both A and B, and B alone. In addition, the character "/" herein generally indicates an "or" relationship between the item preceding the character and the item following the character.

In some embodiments, the same reference numeral denotes the same component. For brevity, detailed descriptions of the same component are omitted in a different embodiment. Understandably, dimensions such as thickness, length, and width of various components in the embodiments of this disclosure shown in the drawings, and dimensions such as overall thickness, length, and width of an integrated device are merely exemplary descriptions, but do not constitute any limitation on this disclosure.

In this disclosure, a battery cell may include a lithium-ion secondary battery, a lithium-ion primary battery, a lithium-sulfur battery, a sodium-lithium-ion battery, a sodium-ion battery, a magnesium-ion battery, or the like. The embodiments of this disclosure do not limit the type of the battery cell. The battery cell may be in a cylindrical shape, a flat shape, a cuboidal shape, or other shapes. The embodiments of this disclosure do not limit the shape of the battery cell. Depending on the form of packaging, the battery cell is typically classed into three types: cylindrical battery cell, prismatic battery cell, and pouch-type battery cell. The embodiments of this disclosure do not limit the form of the battery cell.

The battery mentioned in the embodiments of this disclosure means a stand-alone physical module that includes one or more battery cells to provide a higher voltage and a higher capacity. For example, the battery mentioned in this disclosure may include a battery module, a battery pack, or the like. A battery typically includes a box configured to package one or more battery cells. The box can prevent liquid or other foreign matters from affecting the charging or discharge of the battery cells.

A battery cell includes an electrode assembly and an electrolytic solution. The electrode assembly includes a positive electrode plate, a negative electrode plate, and a separator. The battery cell works primarily by relying on movement of metal ions between the positive electrode plate and the negative electrode plate. The positive electrode plate includes a positive current collector and a positive active material body. The positive active material body is coated on a surface of the positive current collector. A part that is of the positive current collector and that is not coated with the positive active material body protrudes from a part that is of the positive current collector and that is coated with the positive active material body. The part that is of the positive current collector and that is not coated with the positive active material body serves as a positive tab. Using a lithium-ion battery as an example, the positive current collector may be made of aluminum, and a positive active material may be lithium cobalt oxide, lithium iron phosphate, ternary lithium, lithium manganese oxide, or the like. The negative electrode plate includes a negative current collector and a negative active material body. The negative active material body is coated on a surface of the negative current collector. A part that is of the negative current collector and that is not coated with the negative active material body protrudes from a part that is of the negative current collector and that is coated with the negative active material body. The part that is of the negative current collector and that is not coated with the negative active material body serves as a negative tab. The negative current collector may be made of copper, and a negative active material may be carbon, silicon, or the like. In order to ensure passage of a large current without fusing off, the positive tab is plural in number, and the plurality of positive tabs are folded together; the negative tab is plural in number, and the plurality of negative tabs are folded together. The separator may be made of a material such as polypropylene (PP) or polyethylene (PE). In addition, the electrode assembly may be a jelly-roll structure or a stacked structure, without being limited herein.

The development of the battery technology needs to allow for a plurality of design factors, including performance parameters such as energy density, cycle life, discharge capacity, charge rate, and discharge rate, and also needs to ensure safety of the battery.

For a lithium ion battery, during charging, lithium ions are deintercalated from a positive electrode and intercalated into a negative electrode; and, during discharging, the lithium ions are deintercalated from the negative electrode and intercalated into the positive electrode. During charging of the lithium-ion battery, lithium plating may occur due to abnormal factors such as an insufficient lithiation space of the negative electrode, excessive lithium-ion migration resistance, lithium ions prematurely deintercalated from the positive electrode but unable to be intercalated into the negative electrode in an equal amount. The lithium ions unable to be intercalated into the negative electrode have to gain electrons on a surface of the negative electrode, thereby forming a lithium simple-substance phenomenon, that is, a lithium plating phenomenon.

The inventor(s) finds that lithium plating is prone to occur at the bend region of the electrode assembly. As found through further research, during winding or folding of the positive electrode plate and the negative electrode plate, detachment of coating is prone to occur at a part of the negative electrode plate in the bend region, resulting in fall-off of a negative active material of the negative electrode plate. Consequently, during charging, a part of the lithium ions deintercalated from the positive electrode plate are unable to be intercalated into the negative electrode plate, resulting in lithium plating.

In view of this, an embodiment provides a technical solution. A barrier layer is disposed between the positive current collecting layer and the positive active material layer of the positive electrode plate at the bend portion. The barrier layer is configured to prevent electron transport between the positive current collecting layer and the positive active material layer, so as to weaken or preclude delithiation reactions of the positive active material layer at the bend portion. No lithium ions or just a small quantity of lithium ions are deintercalated from the positive active material layer, thereby reducing occurrence of lithium plating and improving safety and service life of the battery cell.

The technical solutions described in this embodiment are applicable to a battery and an electrical device that uses the battery.

The electrical device may be a vehicle, a mobile phone, a portable device, a notebook computer, a ship, a spacecraft, an electric toy, a power tool, or the like. The vehicle may be an oil-fueled vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, such as a game console, an electric car toy, an electric ship toy, an electric airplane toy, and the like. The power tool includes an electrical metal cutting tool, an electrical grinding tool, an electrical assembling tool, and a power tool for use in railways. Examples of the power tool are an electrical drill, an electrical grinder, an electrical wrench, an electrical screwdriver, an electrical hammer, an electrical impact drill, a concrete vibrator, an electrical planer, and the like. Embodiments of this disclosure do not particularly limit the electrical device.

For ease of description in the following embodiments, a vehicle is used as an example of the electrical device.

Referring to FIG. 1, FIG. 1 is a schematic structural diagram of a vehicle 1000 according to some embodiments of this disclosure. A battery 100 is disposed inside the vehicle 1000. The battery 100 may be disposed at the bottom, front, or rear of the vehicle 1000. The battery 100 may be configured to supply power to the vehicle 1000. For example, the battery 100 may serve as an operating power supply of the vehicle 1000.

The vehicle 1000 may further include a controller 200 and a motor 300. The controller 200 is configured to control the battery 100 to supply power to the motor 300, for example, to start or navigate the vehicle 1000, or meet the operating power requirements of the vehicle in operation.

In some embodiments, the battery 100 serves not only as an operating power supply of the vehicle 1000, but may also serve as a drive power supply of the vehicle 1000 to provide driving power for the vehicle 1000 in place of or partially in place of oil or natural gas.

Figure 2:
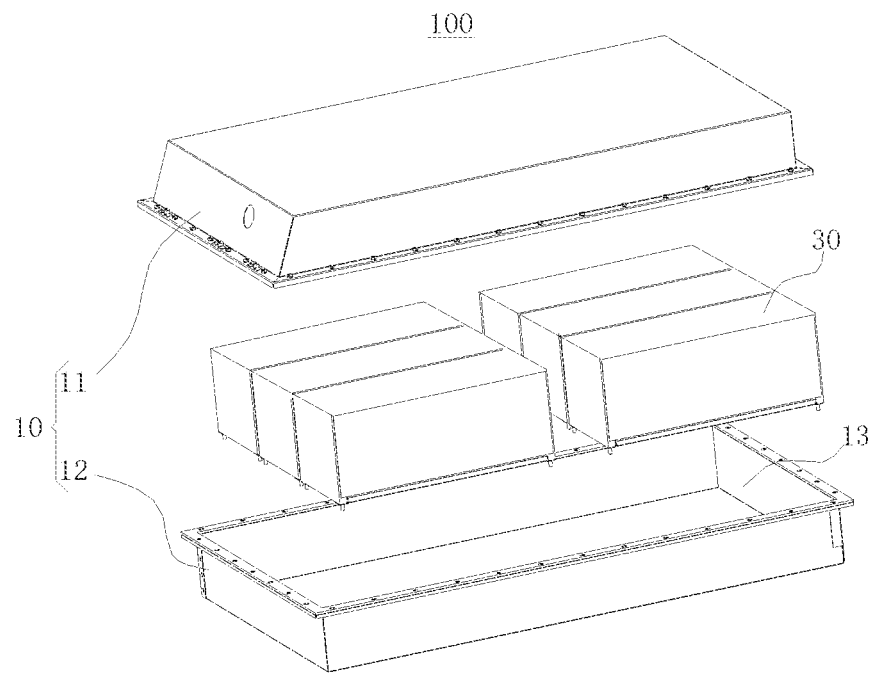
FIG. 2 is an exploded view of a battery according to some embodiments of this disclosure.

Referring to FIG. 2, FIG. 2 is an exploded view of a battery 100 according to some embodiments of this disclosure. The battery 100 includes a box 10 and a battery cell 20 (not shown in FIG. 2). The battery cell 20 is accommodated in the box 10.

The box 10 is configured to accommodate the battery cell 20. The box 10 may be one of various structures. In some embodiments, the box 10 may include a first part 11 and a second part 12. The first part 11 and the second part 12 fit each other. The first part 11 and the second part 12 together define an accommodation space 13 configured to accommodate the battery cell 20. The second part 12 may be a hollow structure opened at one end. The first part 11 may be a plate-like structure. The first part 11 fits on an opening side of the second part 12 so that the first part 11 and the second part 12 together define the accommodation space 13. Alternatively, both the first part 11 and the second part 12 may be hollow structures opened at one side. The opening side of the first part 11 fits the opening side of the second part 12. Definitely, the first part 11 and the second part 12 may be in various shapes, such as a cylinder or a cuboid.

There may be one or more battery cells 20 in the battery 100. If there are a plurality of battery cells 20, the plurality of battery cells 20 may be connected in series, parallel, or series-and-parallel pattern. The series-and-parallel pattern means a combination of series connection and parallel connection of the plurality of battery cells 20. The plurality of battery cells 20 may be directly connected in series, parallel, or series-and-parallel pattern, and then the whole of the plurality of battery cells 20 may be accommodated in the box 10. Alternatively, the plurality of battery cells 20 may be connected in series, parallel, or series-and-parallel pattern to form a battery module 30 first. A plurality of battery modules 30 are then connected in series, parallel, or series-and-parallel pattern to form a whole for being accommodated in the box 10.

Figure 3:
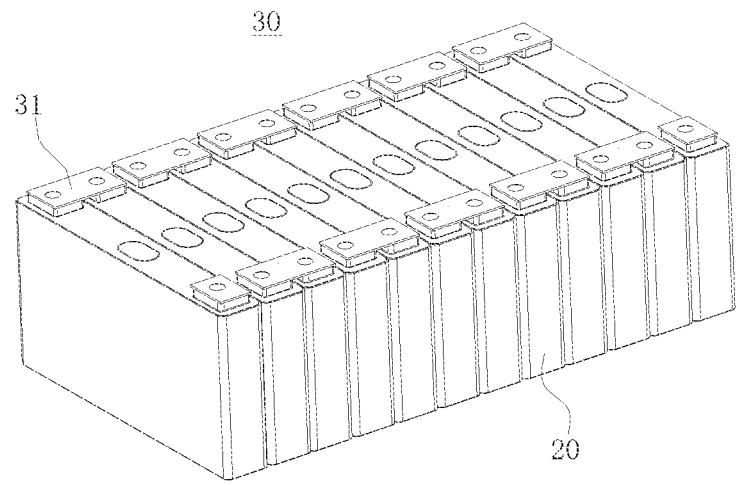
FIG. 3 is a schematic structural diagram of a battery module shown in FIG. 2.

In some embodiments, referring to FIG. 3, FIG. 3 is a schematic structural diagram of a battery module 30 shown in FIG. 2. The battery 100 includes a plurality of battery modules 30. Each battery module 30 includes a plurality of battery cells 20. The plurality of battery cells 20 are connected in series, parallel, or series-and-parallel pattern to form the battery module 30 first. A plurality of battery modules 30 are then connected in series, parallel, or series-and-parallel pattern to form a whole for being accommodated in the box 10.

The plurality of battery cells 20 in the battery module 30 may be electrically connected by a busbar component 31, so as to implement parallel connection, series connection, or series-parallel connection between the plurality of battery cells 20 in the battery module 30.

Figure 4:
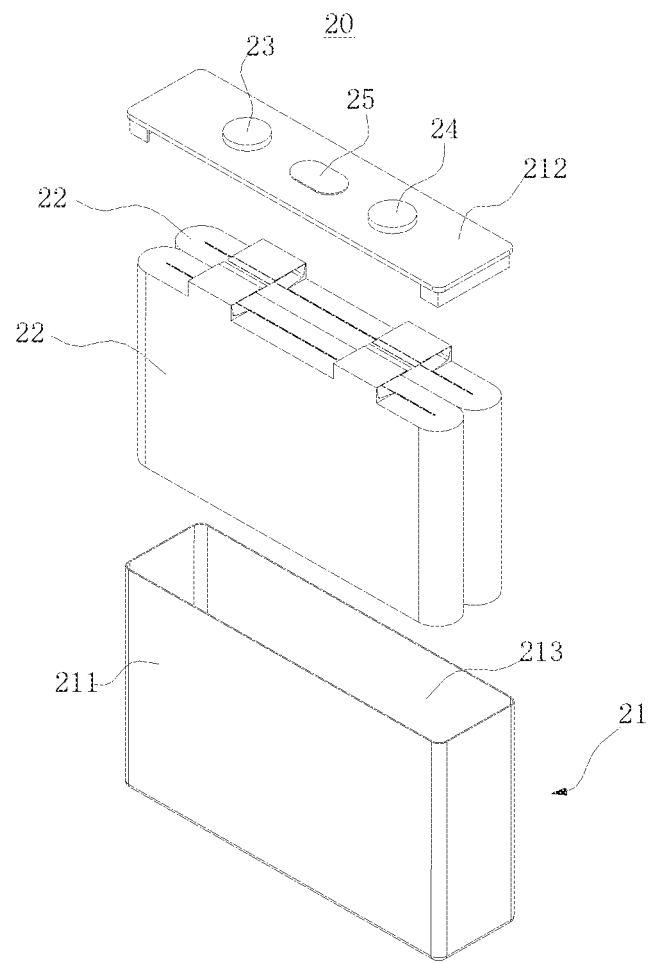
FIG. 4 is an exploded view of a battery cell shown in FIG. 3.

Referring to FIG. 4, FIG. 4 is an exploded view of the battery cell 20 shown in FIG. 3. The battery cell 20 according to this embodiment of this disclosure includes a shell 21 and an electrode assembly 22. The electrode assembly 22 is accommodated in the shell 21.

In some embodiments, the shell 21 may be further configured to accommodate an electrolyte such as an electrolytic solution. The shell 21 may be one of various structures.

In some embodiments, the shell 21 may include a housing 211 and a cover 212. The housing 211 is a hollow structure opened on one side. The cover 212 fits on, and is hermetically connected to, the opening of the housing 211, to form a sealed space 213 configured to accommodate the electrode assembly 22 and the electrolyte.

During assembling of the battery cell 20, the electrode assembly 22 may be put into the housing 211 first. The housing 211 is filled with an electrolyte, and then the cover 212 fits on the opening of the housing 211.

The housing 211 may be in various shapes such as a cylinder or a cuboid. The shape of the housing 211 may be determined depending on the specific shape of the electrode assembly 22. For example, if the electrode assembly 22 is a cylindrical structure, the housing 211 may be a cylindrical housing. If the electrode assembly 22 is a cuboidal structure, the housing 211 may be a cuboidal housing. Also, the cover 212 may be one of various structures. For example, the cover 212 is a plate-like structure, a hollow structure opened at one end, or the like. For example, in FIG. 4, the housing 211 is a cuboidal structure, the cover 212 is a plate-like structure, and the cover 212 fits on the opening of the housing 211.

In some embodiments, the battery cell 20 may further include a positive electrode terminal 23, a negative electrode terminal 24, and a pressure relief mechanism 25. The positive electrode terminal 23, the negative electrode terminal 24, and the pressure relief mechanism 25 are all mounted on the cover 212. The positive electrode terminal 23 and the negative electrode terminal 24 are both configured to electrically connect to the electrode assembly 22. That is, the positive electrode terminal 23 is configured to electrically connect to the positive electrode plate 222, and the negative electrode terminal 24 is configured to electrically connect to the negative electrode plate 221. The pressure relief mechanism 25 is configured to release pressure inside the battery cell 20 when an internal pressure or temperature of the battery cell 20 reaches a preset value.

For example, as shown in FIG. 4, the pressure relief mechanism 25 is located between the positive electrode terminal 23 and the negative electrode terminal 24. The pressure relief mechanism 25 may be a component such as an explosion-proof valve, a rupture disk, a gas valve, a pressure relief valve, or a safety valve.

Understandably, the shell 21 is not limited to the structures enumerated above. The shell 21 may be another structure instead. For example, the shell 21 includes a housing 211 and two covers 212. The housing 211 is a hollow structure opened on two opposite sides. One cover 212 fits on, and is hermetically connected to, one corresponding opening of the housing 211, to form a sealed space 213 configured to accommodate the electrode assembly 22 and the electrolyte. In such a structure, the positive electrode terminal 23 and the negative electrode terminal 24 may be mounted on the same cover 212, or may be mounted on different covers 212. The pressure relief mechanism 25 may be mounted on one cover 212, or the pressure relief mechanism 25 may be mounted on both covers 212.

It should be noted that, in this embodiment of this disclosure, one or more electrode assemblies 22 may be accommodated in the shell 21. For example, in FIG. 4, there are two electrode assemblies 22.

Figure 5:
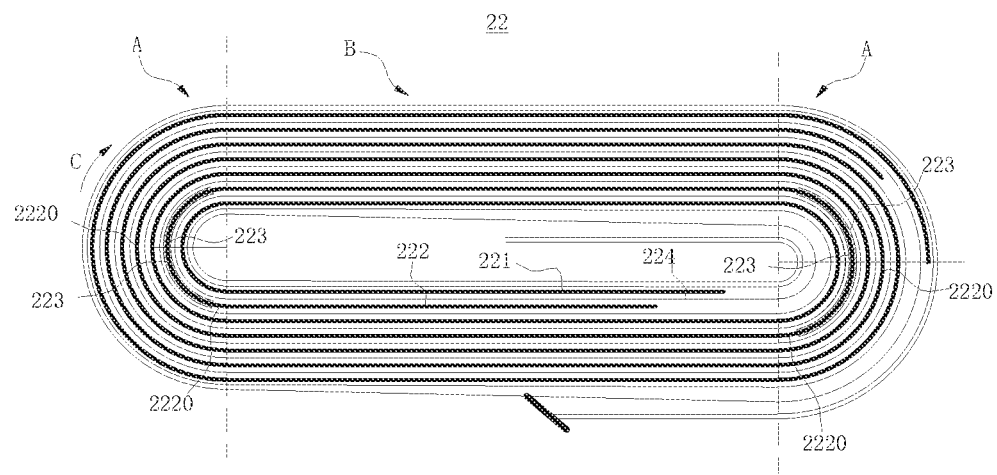
FIG. 5 is a schematic structural diagram of an electrode assembly according to some embodiments of this disclosure.
Figure 6:
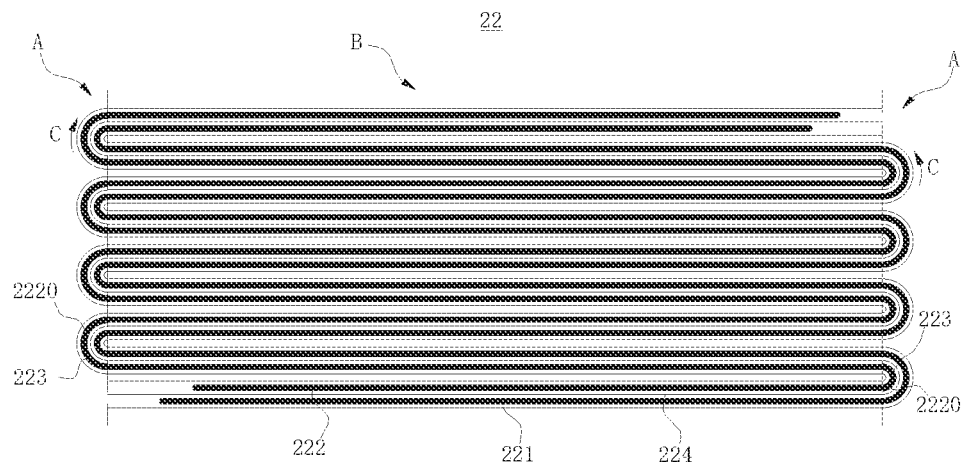
FIG. 6 is a schematic structural diagram of an electrode assembly according to other embodiments of this disclosure.

Referring to FIG. 5 and FIG. 6, FIG. 5 is a schematic structural diagram of an electrode assembly 22 according to some embodiments of this disclosure; and FIG. 6 is a schematic structural diagram of an electrode assembly 22 according to other embodiments of this disclosure. The electrode assembly 22 includes a negative electrode plate 221 and a positive electrode plate 222. The negative electrode plate 221 and the positive electrode plate 222 are wound or folded to form a bend region A.

The positive electrode plate 222 includes a plurality of bend portions 2220 located in the bend region A. Each bend portion 2220 includes a positive current collecting layer 2220a (not shown in FIG. 5 or FIG. 6) and a positive active material layer 2220b (not shown in FIG. 5 or FIG. 6). The positive current collecting layer 2220a is coated with the positive active material layer 2220b on at least one side in a thickness direction of the positive electrode plate 222. A barrier layer 223 is disposed between the positive current collecting layer 2220a and the positive active material layer 2220b. The barrier layer 223 is configured to prevent electron transport between the positive current collecting layer 2220a and the positive active material layer 2220b.

The barrier layer 223 is disposed between the positive current collecting layer 2220a and the positive active material layer 2220b of the bend portion 2220. The barrier layer 223 can prevent electron transport between the positive current collecting layer 2220a and the positive active material layer 2220b, so as to weaken or preclude delithiation reactions of the positive active material layer 2220b of the positive electrode plate 222 at the bend portion 2220. Even if a negative active material falls off from the bend portion 2220 of the negative electrode plate 221, because no lithium ions or just a small quantity of lithium ions need to be intercalated, the probability of lithium plating is reduced, or occurrence of lithium plating is avoided, thereby improving battery safety.

It should be noted that the positive active material layer 2220b cannot release ions until electron transport occurs on an interface between the positive current collecting layer 2220a and the positive active material layer 2220b. The barrier layer 223 prevents the electron transport between the positive current collecting layer 2220a and the positive active material layer 2220b. Therefore, the barrier layer 223 actually serves to prevent the positive active material layer 2220b from releasing ions.

For example, the ions released by particles in the positive active material layer 2220b are lithium ions. That is, the barrier layer 223 serves to prevent the particles from releasing lithium ions.

As shown in FIG. 5, the positive electrode plate 222 and the negative electrode plate 221 may be stacked first and then wound to form a jelly-roll structure that includes a bend region A, for example, a flat jelly-roll structure. As shown in FIG. 6, the positive electrode plate 222 and the negative electrode plate 221 may be stacked first and then bent to form a folded structure that includes a bend region A. For example, the positive electrode plate 222 and the negative electrode plate 221 are stacked and then folded back and forth continuously in an S shape to form a folded structure.

In some embodiments, the electrode assembly 22 may further include a separator 224. The separator 224 is configured to separate the positive electrode plate 222 from the negative electrode plate 221 to reduce risks of short circuits between the positive electrode plate 222 and the negative electrode plate 221.

The separator 224 may be made of a material such as polypropylene (PP) or polyethylene (PE).

If the electrode assembly 22 is a jelly-roll structure, the electrode plates and separator may be stacked sequentially in order from the positive electrode plate 222 to the separator 224, the negative electrode plate 221, and then the separator 224, and then the four items are wound to form a jelly-roll structure. If the electrode assembly 22 is folded structure, the items may be stacked sequentially in order from the separator 224 to the positive electrode plate 222, the separator 224, the negative electrode plate 221, and then the separator 224, and then the five items are folded to form a folded structure.

Regardless of whether the electrode assembly 22 is a jelly-roll structure or a folded structure, the electrode assembly 22 may further include a straight region B. The straight region B is connected to the bend region A. The bend region A may be disposed at both opposite ends of the straight region B. The straight region B is a straight-structured region of the electrode assembly 22. A part that is of the positive electrode plate 222 and that is located in the straight region B and a part that is of the negative electrode plate 221 and that is located in the straight region B are both arranged in a flat and straight manner approximately. In a direction of extending the part that is of the positive electrode plate 222 and that is located in the straight region B, the two bend regions A are located at two ends of the straight region B respectively. The bend region A is a bend-structured region of the jelly-roll structure. A part that is of the positive electrode plate 222 and that is located in the bend region A (the part forms the bend portion 2220) and a part that is of the negative electrode plate 221 and that is located in the bend region A are both arranged in a bent manner. For example, the part that is of the positive electrode plate 222 and that is located in the bend region A (the part forms the bend portion 2220) and the part that is of the negative electrode plate 221 and that is located in the bend region A are both arc-shaped.

In some embodiments, as shown in FIG. 5 and FIG. 6, both ends of the barrier layer 223 extending along a bending direction C of the bend portion 2220 are located in the bend region A. That is, the entire barrier layer 223 is located in the bend region A, thereby alleviating or avoiding an impact caused by the barrier layer 223 to a part that is of the positive electrode plate 222 and that is located outside the bend region A.

It should be noted that, if one end or both ends of the barrier layer 223 are just located at a boundary between the straight region B and the bend region A, it is also deemed that the barrier layer 223 is located in the bend region A. The bending direction C of the bend portion 2220 is a circumferential direction of an arc on which the bend portion 2220 is located. For example, as shown in FIG. 6, both ends of the barrier layer 223 extending along the bending direction C of the bend portion 2220 are located at a boundary between the bend region A and the straight region B.

Figure 8:
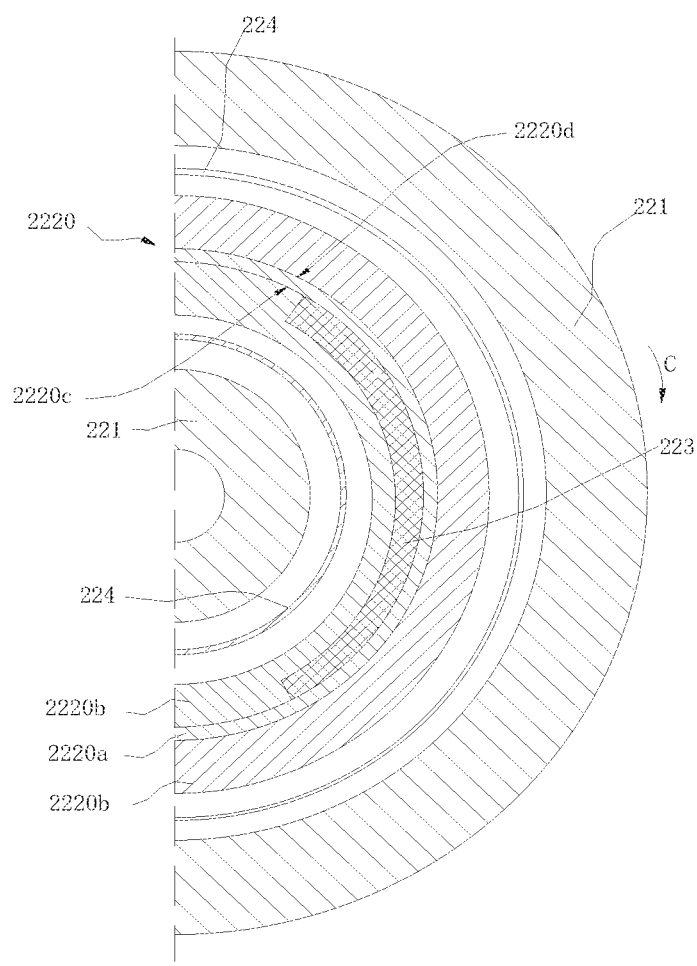
FIG. 8 is a partial view of a part that is of an electrode assembly and that is located in a bend region according to some embodiments of this disclosure.

In some embodiments, as shown in FIG. 8, FIG. 8 is a partial view of a part that is of an electrode assembly and that is located in a bend region according to some embodiments of this disclosure. Both ends of the barrier layer 223 extending along the bending direction C of the bend portion 2220 are located in the bend region A, and one end or both ends of the barrier layer 223 are spaced apart from the boundary between the straight region B and the bend region A. For example, as shown in FIG. 8, neither end of the barrier layer 223 extends to the boundary between the straight region B and the bend region A. The barrier layer 223 is not disposed in a partial section at the two ends of the bend portion 2220. In such a partial section, electrons can be transported between the positive current collecting layer 2220a and the positive active material layer 2220b, and the positive active material layer 2220b may release lithium ions. In this way, the barrier layer 223 can prevent some electrons from being transported between the positive current collecting layer 2220a and the positive active material layer 2220b, so as to reduce the occurrence of lithium plating, and at the same time, can ensure a relatively high energy density of the electrode assembly.

In other embodiments, both ends of the barrier layer 223 extending along the bending direction C of the bend portion 2220 are located in the straight region B. In still other embodiments, one end of the barrier layer 223 extending along the bending direction C of the bend portion 2220 is located in the straight region B, and the other end is located in the bend region A.

Figure 7:
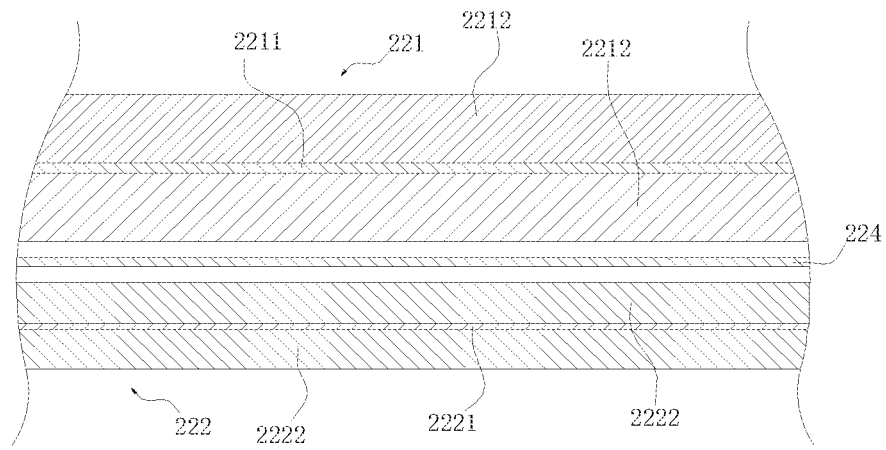
FIG. 7 is a partial enlarged view of an electrode assembly according to some embodiments of this disclosure.

In some embodiments, referring to FIG. 7, FIG. 7 is a partial enlarged view of an electrode assembly 22 according to some embodiments of this disclosure. The positive electrode plate 222 includes a positive current collector 2221 and a positive active material body 2222 coated on both sides of the positive current collector 2221 in the thickness direction. The positive current collector 2221 may include a part that is not coated with the positive active material body 2222. This part may serve as a positive tab, and may be used for electrical connection to the positive electrode terminal 23 (referring to FIG. 4). The negative electrode plate 221 may include a negative current collector 2211 and a negative active material body 2212 coated on both sides of the negative current collector 2211 in the thickness direction. The negative current collector 2211 may include a part that is not coated with the negative active material body 2212. This part may serve as a negative tab, and may be used for electrical connection to the negative electrode terminal 24 (referring to FIG. 4).

Understandably, the positive current collecting layer 2220a of the bend portion 2220 is the part that is of the positive current collector 2221 and that is located in the bend region A. The positive active material layer 2220b of the bend portion 2220 is the part that is of the positive active material body 2222 and that is located in the bend region A.

In this embodiment, in the bend portion 2220, the positive active material layer 2220b may be coated on an inner side 2220c of the positive current collecting layer 2220a, or the positive active material layer 2220b may be coated on an outer side 2220d of the positive current collecting layer 2220a, or the positive active material layer 2220b may be coated on both the outer side 2220d and the inner side 2220c of the positive current collecting layer 2220a. In the electrode assembly 22, as long as the barrier layer 223 is disposed for one positive active material layer 2220b, the occurrence of lithium plating can be reduced effectively. Understandably, the inner side 2220c of the positive current collecting layer 2220a is located inside against the outer side 2220d. The inner side 2220c of the positive current collecting layer 2220a is closer to the straight region B than the outer side 2220d.

In some embodiments, referring to FIG. 8, FIG. 8 is a partial enlarged view of an electrode assembly 22 according to some embodiments of this disclosure. One surface of the barrier layer 223 is attached to the positive current collecting layer 2220a, and the other surface is attached to the positive active material layer 2220b.

Attaching means bonding or coating or spraying. The barrier layer 223 is firmly connected to the positive current collecting layer 2220a and the positive active material layer 2220b by attaching, thereby alleviating or avoiding dislocation of the barrier layer 223 during use of the battery cell 20.

For ease of description, in the following embodiments, the arrangement of the barrier layer 223 is described in detail by using an example in which the electrode assembly 22 is a jelly-roll structure.

In some embodiments, referring to FIG. 8, FIG. 8 is a partial view of a part that is of an electrode assembly 22 and that is located in a bend region A according to some embodiments of this disclosure. The positive active material layer 2220b is coated on the inner side 2220c of the positive current collecting layer 2220a in the thickness direction of the positive electrode plate 222. The barrier layer 223 is disposed between the positive active material layer 2220b located on the inner side 2220c and the positive current collecting layer 2220a in at least one bend portion 2220. The barrier layer 223 can prevent at least a part of particles in the positive active material layer 2220b on the inner side 2220c of the positive current collecting layer 2220a from releasing lithium ions to the negative electrode plate 221, thereby alleviating the lithium plating of the negative electrode plate 221 occurring at a section located inside against the barrier layer 223 in the bend region A.

The thickness direction of the positive electrode plate 222 is also the thickness direction of the positive current collecting layer 2220a.

In this embodiment, the outer side 2220d of the positive current collecting layer 2220a may be coated with the positive active material layer 2220b, or coated with no positive active material layer 2220b. In FIG. 8, as an example, the positive active material layer 2220b is coated on both the outer side 2220d and the inner side 2220c of the positive current collecting layer 2220a. Definitely, the barrier layer 223 may be disposed between the positive active material layer 2220b located on the inner side 2220c and the positive current collecting layer 2220a in just one bend portion 2220; or, the barrier layer 223 may be disposed between the positive active material layer 2220b located on the inner side 2220c and the positive current collecting layer 2220a in a plurality of bend portions 2220.

It should be noted that, as shown in FIG. 8, the two ends of the barrier layer 223 are at a distance from the boundary between the straight region B and the bend region A. The positive active material layer 2220b of the bend portion 2220 includes a third part connected to the positive current collecting layer 2220a and a fourth part corresponding to the barrier layer 223. A thickness of the fourth part may be the same as a thickness of the third part. In this way, during manufacturing of the positive active material layer 2220b, the thickness is basically the same between all parts of the positive active material layer 2220b, thereby simplifying the manufacturing process. Alternatively, the thickness of the fourth part is smaller than the thickness of the third part. For example, a sum of the thickness of the fourth part and the thickness of the barrier layer 223 is equal to the thickness of the third part. In this way, the thicknesses of all parts of the bend portion 2220 along the bending direction C are close or basically equal to each other, and force distribution is relatively even between the parts.

Figure 9:
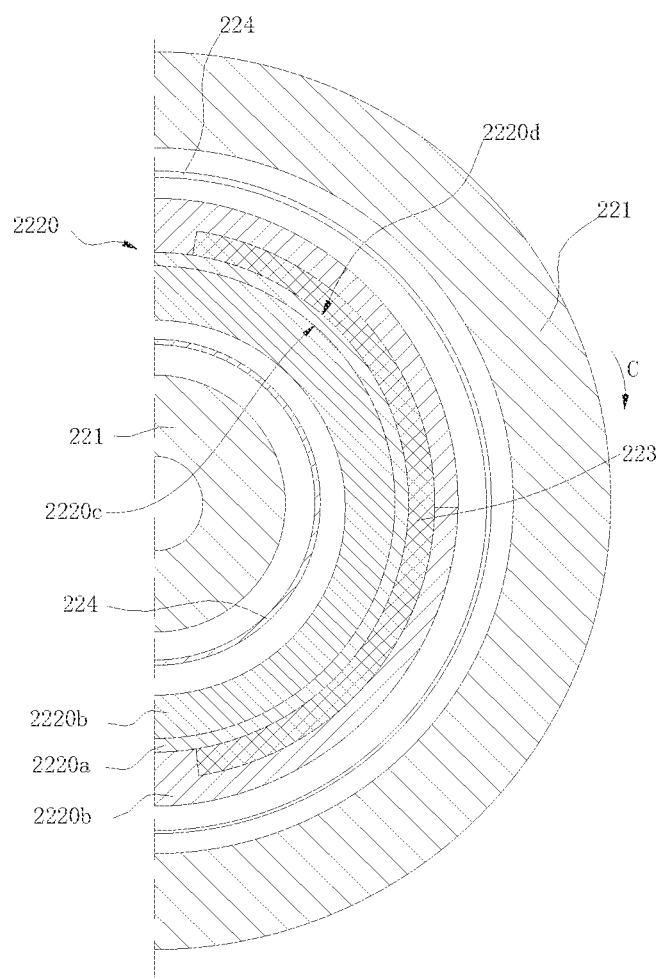
FIG. 9 is a partial view of a part that is of an electrode assembly and that is located in a bend region according to other embodiments of this disclosure.

In some embodiments, referring to FIG. 9, FIG. 9 is a partial view of a part that is of an electrode assembly 22 and that is located in a bend region A according to other embodiments of this disclosure. The positive active material layer 2220b is coated on the outer side 2220d of the positive current collecting layer 2220a in the thickness direction of the positive electrode plate 222. The barrier layer 223 is disposed between the positive active material layer 2220b located on the outer side 2220d and the positive current collecting layer 2220a in at least one bend portion 2220. The barrier layer 223 can prevent electron transport between the positive current collecting layer 2220a and the positive active material layer 2220b on the inner side 2220c of the positive current collecting layer, and alleviate lithium plating of a negative active material layer of the negative electrode plate 221 on the outer side 2220d.

Figure 10:
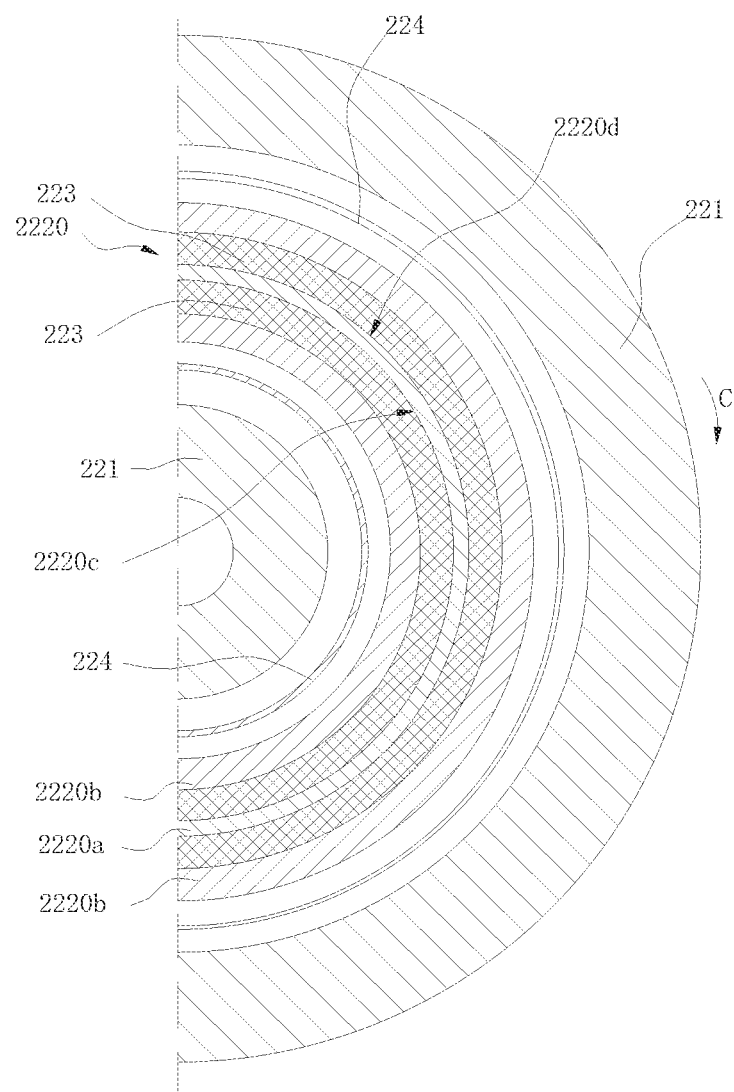
FIG. 10 is a partial view of a part that is of an electrode assembly and that is located in a bend region according to still other embodiments of this disclosure.

In this embodiment, the inner side 2220c of the positive current collecting layer 2220a may be coated with the positive active material layer 2220b, or coated with no positive active material layer 2220b. In FIG. 9, as an example, the positive active material layer 2220b is coated on both the outer side 2220d and the inner side 2220c of the positive current collecting layer 2220a. Definitely, the barrier layer 223 may be disposed between the positive active material layer 2220b located on the inner side 2220c and the positive current collecting layer 2220a in just one bend portion 2220; or, the barrier layer 223 may be disposed between the positive active material layer 2220b located on the inner side 2220c and the positive current collecting layer 2220a in a plurality of bend portions 2220. In some embodiments, referring to FIG. 10, FIG. 10 is a partial view of a part that is of an electrode assembly 22 and that is located in a bend region A according to still other embodiments of this disclosure. The positive active material layer 2220b is coated on both the outer side 2220d and the inner side 2220c of the positive current collecting layer 2220a. The barrier layer 223 is disposed between the positive active material layer 2220b located on the inner side 2220c and the positive current collecting layer 2220a, and between the positive active material layer 2220b located on the outer side 2220d and the positive current collecting layer 2220a, in at least one bend portion 2220.

In this way, the barrier layer 223 can prevent electron transport between the positive active material layer 2220b located on the outer side 2220d of the positive current collecting layer 2220a and the positive current collecting layer 2220a, and prevent electron transport between the positive active material layer 2220b located on the inner side 2220c of the positive current collecting layer 2220a and the positive current collecting layer 2220a, thereby alleviating lithium plating of the negative active material layer on both the inner side and the outer side 2220d in the negative electrode plate 221. In FIG. 10, as an example, the barrier layer 223 is disposed for both the positive active material layer 2220b on the inner side and the positive electrode active material layer 2220b on the outer side in at least one bend portion 2220.

In embodiments, the barrier layer 223 may be disposed in all the bend portions 2220 in the bend region A, or the barrier layer 223 may be disposed in a part of the bend portions 2220 in the bend region A. For example, the barrier layer 223 is disposed in one, two, or three innermost bend portions 2220 in the bend region A.

Figure 11:
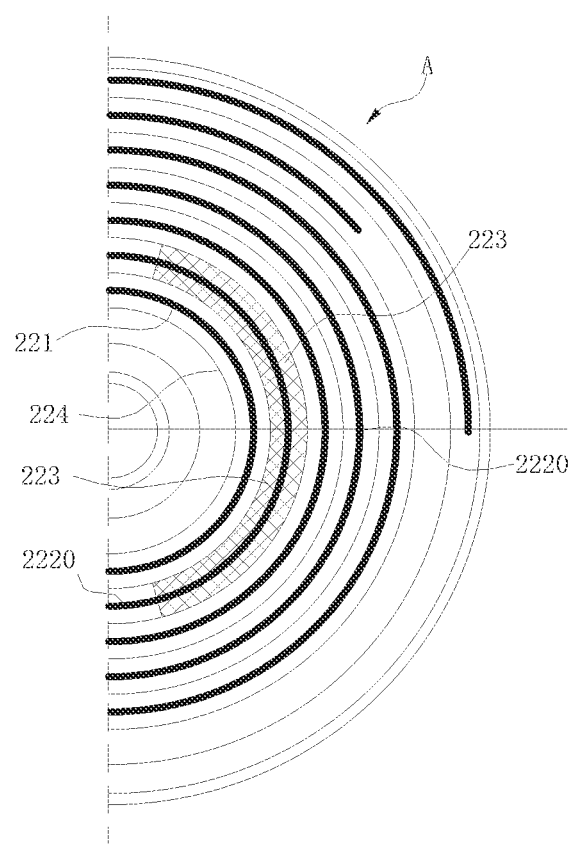
FIG. 11 is a partial view of the electrode assembly shown in FIG. 5.

In some embodiments, referring to FIG. 11, FIG. 11 is a partial view of the electrode assembly 22 shown in FIG. 5. Using an example in which the positive electrode plate 222 and the negative electrode plate 221 are wound to form a jelly-roll structure that includes a bend region, the innermost electrode plate in the bend region A is a negative electrode plate 221. The barrier layer 223 is disposed in the innermost bend portion 2220 of the bend region A.

The innermost electrode plate in the bend region A is a negative electrode plate 221. A section that is of the negative electrode plate 221 and that is closer to the inside in the bend region is bent to a greater extent, incurs severer detachment of coating than other sections, and is more prone to lithium plating than other sections. Therefore, the barrier layer 223 is disposed in the innermost bend portion 2220 of the bend region A to alleviate lithium plating effectively.

It should be noted that, the barrier layer 223 may be disposed between the positive active material layer 2220b located on the inner side 2220c and the positive current collecting layer 2220a in an innermost bend portion 2220 of the bend region A; or, the barrier layer 223 may be disposed between the positive active material layer 2220b located on the outer side 2220d and the positive current collecting layer 2220a in the innermost bend portion 2220 of the bend region A; or, the barrier layer 223 may be disposed between the positive active material layer 2220b located on the inner side 2220c and the positive current collecting layer 2220a in an innermost bend portion 2220 of the bend region A, and between the positive active material layer 2220b located on the outer side 2220d and the positive current collecting layer 2220a in the innermost bend portion 2220 of the bend region A.

In some embodiments, one end or two ends of the barrier layer 223 extending along a first direction do not exceed the positive active material layer 2220b, the first direction being perpendicular to a bending direction C of the bend region A.

In this way, a section not covered by the barrier layer 223 exists at one end or two ends of the bend portion 2220 along a direction perpendicular to the bending direction C. Therefore, some electrons are prevented from being transported between the positive current collecting layer 2220a and the positive active material layer 2220b, so as to reduce the occurrence of lithium plating. At the same time, a relatively high energy density of the electrode assembly is ensured.

Figure 12:
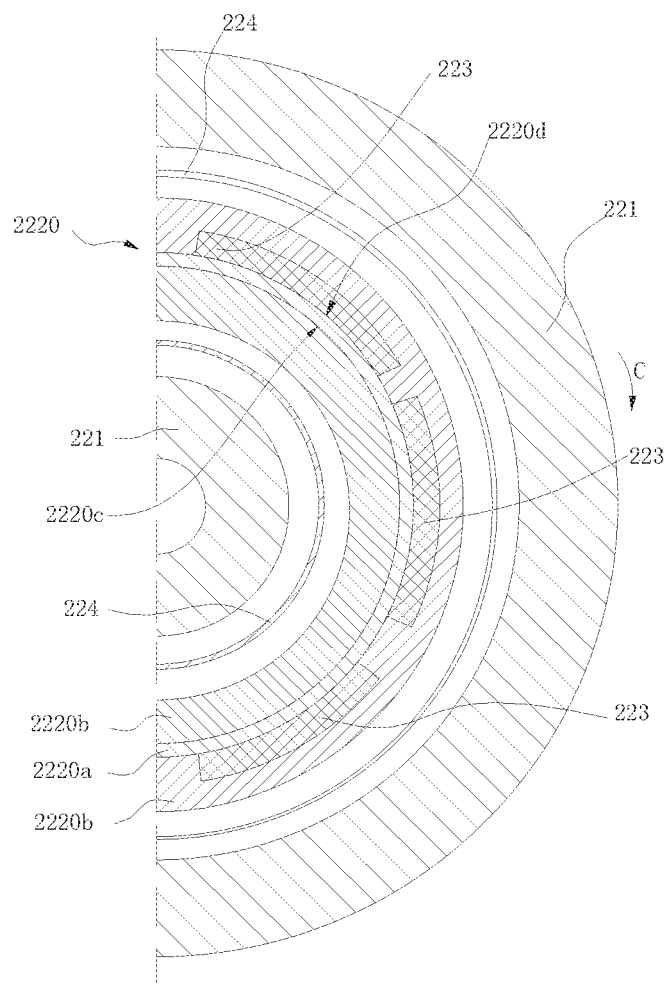
FIG. 12 is a partial view of a part that is of an electrode assembly and that is located in a bend region according to still other embodiments of this disclosure.

In some embodiments, referring to FIG. 12, FIG. 12 is a partial view of a part that is of an electrode assembly and that is located in a bend region A according to still other embodiments. There are a plurality of discrete barrier layers 223. The plurality of barrier layers 223 are spaced out along the bending direction C of the bend region A, or the plurality of the barrier layers 223 are spaced out along a first direction. The first direction is perpendicular to the bending direction C of the bend region A.

The plurality of barrier layers 223 are disposed discretely. Adjacent barrier layers 223 are spaced out by a given distance along the bending direction C of the bend region A or the first direction. A section not covered by the barrier layer 223 exists at the bend portion 2220. In this way, some electrons are prevented from being transported between the positive current collecting layer 2220a and the positive active material layer 2220b, so as to reduce the occurrence of lithium plating. At the same time, a relatively high energy density of the electrode assembly is ensured. In FIG. 12, as an example, there are a plurality of discrete barrier layers 223. The plurality of barrier layers 223 are spaced out along the bending direction C of the bend region A.

It should be noted that, in the case that the plurality of barrier layers 223 are spaced out along the bending direction C of the bend region A, the plurality of barrier layers 223 may be all located in the bend region A. Alternatively, a part of the barrier layers 223 at one end or both ends in the bending direction C of the bend region A among the plurality of barrier layers 223 may extend to the straight region B. and remaining barrier layers 223 are located in the bend region A. In the case that the plurality of barrier layers 223 are spaced out along the first direction, the plurality of barrier layers 223 may be all located in the bend region A. Alternatively, a part of the barrier layers 223 at one end or both ends in the first direction among the plurality of barrier layers 223 may extend to the straight region B, and remaining barrier layers 223 are located in the bend region A.

In some embodiments, the barrier layer 223 is an insulation layer. Due to a relatively high resistance, the insulation layer can prevent transport of some electrons between the positive current collecting layer 2220a and the positive active material layer 2220b, thereby reducing occurrence of lithium plating.

In some embodiments, the barrier layer 223 includes at least one of an insulation adhesive layer, a ceramic insulation layer, or insulation tape. Depending on actual requirements, a combination of one or more of the insulation adhesive layer, the ceramic insulation layer, or the insulation tape is used as the barrier layer 223, all of which can effectively prevent electron transport between the positive current collecting layer 2220a and the positive active material layer 2220b, thereby reducing occurrence of lithium plating.

In some embodiments, constituents of the insulation adhesive layer include at least one of styrene-butadiene rubber, polyacrylate, polyvinyl chloride, polyvinylidene difluoride, poly(vinylidene fluoride-co-hexafluoropropylene), epoxy resin, poly(butadiene-co-acrylonitrile), polyurethane rubber, polymethyl acrylate, or polyethyl acrylate.

The insulation adhesive layer made of the foregoing constituents can effectively prevent electron transport between the positive current collecting layer 2220a and the positive active material layer 2220b, thereby reducing occurrence of lithium plating.

In some embodiments, two surfaces of the insulation adhesive layer are bonded to the positive current collecting layer 2220a and the positive active material layer 2220b respectively.

The two surfaces of the insulation adhesive layer are adhesive, and are bonded to the positive current collecting layer 2220a and the positive active material layer 2220b respectively to alleviate or avoid dislocation of the insulation adhesive layer during use of the battery cell 20.

In other embodiments, constituents of the insulation adhesive layer further include a colorant. In this way, the insulation adhesive layer differs from the positive current collecting layer 2220a in at least one of pixel distribution, brightness, color, or the like. During preparation of an electrode plate, the position of the insulation adhesive layer of the positive electrode plate 222 can be determined by using a visual inspection device. The position of the insulation adhesive layer is a position at which the bend region A is formed. After the position of the insulation adhesive layer is determined, it is convenient to determine a starting position of winding.

In some embodiments, the ceramic insulation layer is a mixture of ceramic particles and a polymer binder. The ceramic particles include at least one of aluminum oxide, titanium oxide, barium sulfate, or zirconium oxide. Constituents of the polymer binder include at least one of styrene-butadiene rubber, polyacrylate, polyvinyl chloride, polyvinylidene difluoride, poly(vinylidene fluoride-co-hexafluoropropylene), epoxy resin, poly(butadiene-co-acrylonitrile), polyurethane rubber, polymethyl acrylate, or polyethyl acrylate.

In the foregoing technical solution, the polymer binder can be bonded to the positive current collecting layer 2220a and the positive active material layer 2220b. The ceramic particles can prevent electron transport between the positive current collecting layer 2220a and the positive active material layer 2220b, thereby reducing occurrence of lithium plating.

In some embodiments, a substrate material of the insulation tape is polyethylene terephthalate, polyvinyl chloride, polyethylene, or oriented polypropylene.

The insulation tape made of the foregoing material can prevent electron transport between the positive current collecting layer 2220a and the positive active material layer 2220b, thereby reducing occurrence of lithium plating.

Figure 13:
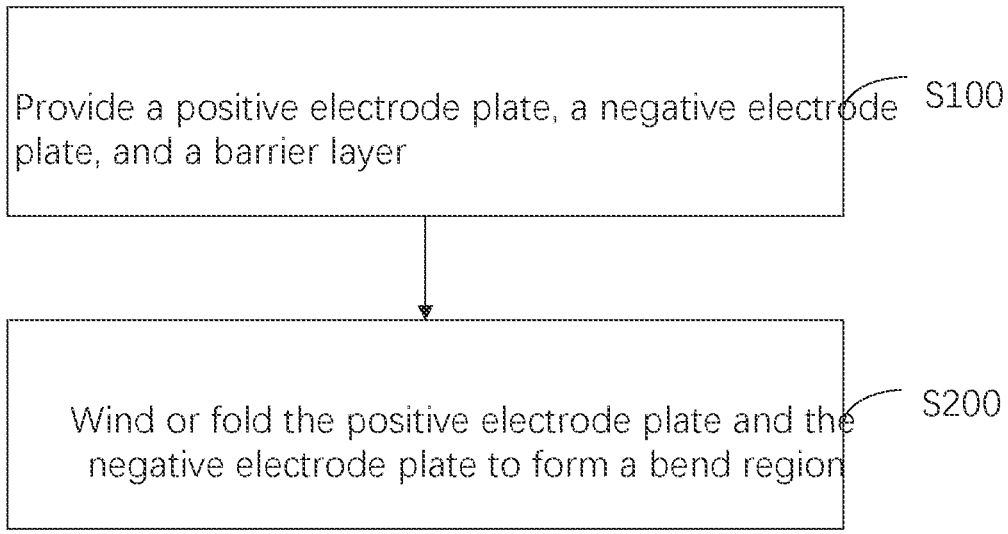
FIG. 13 is a flowchart of a method for manufacturing an electrode assembly according to some embodiments of this disclosure.

Referring to FIG. 13, FIG. 13 is a flowchart of a method for manufacturing an electrode assembly 22 according to some embodiments of this disclosure. The method for manufacturing an electrode assembly 22 includes the following steps:

S100: Provide a positive electrode plate 222, a negative electrode plate 221, and a barrier layer 223; and S200: Wind or fold the positive electrode plate 222 and the negative electrode plate 221 to form a bend region A.

The positive electrode plate 222 includes a plurality of bend portions 2220 located in the bend region A. Each bend portion 2220 includes a positive current collecting layer 2220a and a positive active material layer 2220b. The positive current collecting layer 2220a is coated with the positive active material layer 2220b on at least one surface in a thickness direction of the positive electrode plate 222.

A barrier layer 223 is disposed between the positive current collecting layer 2220a and the positive active material layer 2220b. The barrier layer 223 is configured to prevent electron transport between the positive current collecting layer 2220a and the positive active material layer 2220b.

Figure 14:
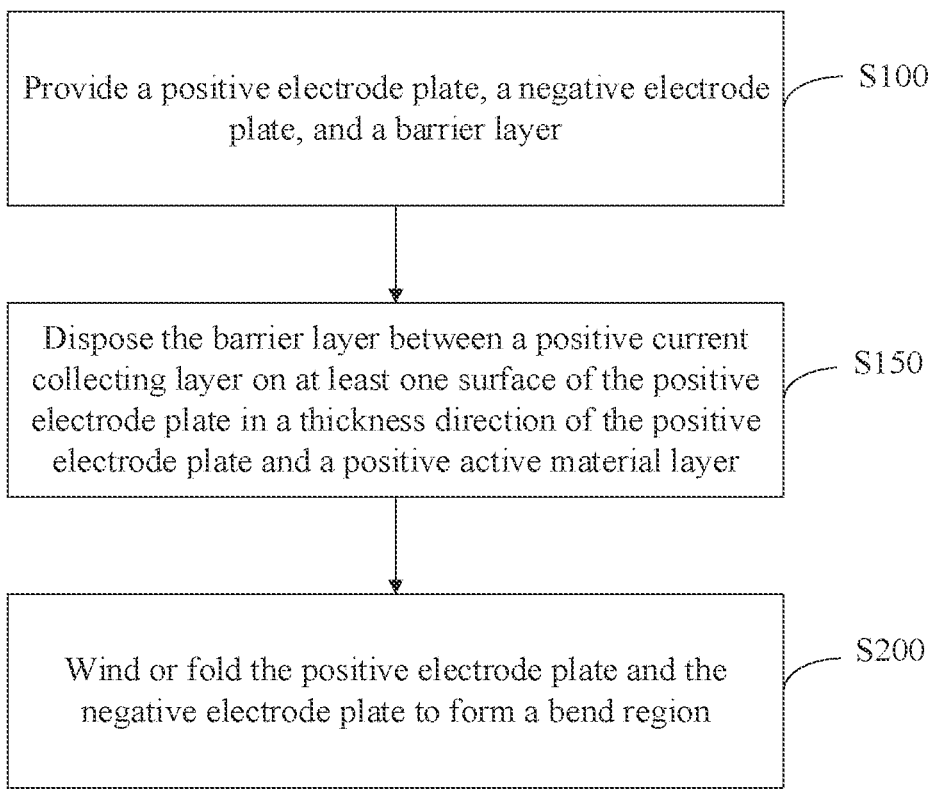
FIG. 14 is a flowchart of a method for manufacturing an electrode assembly according to other embodiments of this disclosure.

In some embodiments, referring to FIG. 14, FIG. 14 is a flowchart of a method for manufacturing an electrode assembly 22 according to other embodiments of this disclosure. The method for manufacturing an electrode assembly 22 further includes the following step.

S150: Dispose the barrier layer 223 between the positive current collecting layer 2220a on at least one surface of the positive electrode plate in the thickness direction of the positive electrode plate 222 and the positive active material layer 2220b before winding or folding the positive electrode plate 222 and the negative electrode plate 221.

Using an example in which the barrier layer 223 is an insulation adhesive layer, before the positive electrode plate 222 and the negative electrode plate 221 are wound or folded, the material of the insulation adhesive layer may be coated on the positive active material layer 2220b of the positive electrode plate 222 first, and is cured to obtain an insulation adhesive layer. Subsequently, the positive electrode plate 222 and the negative electrode plate 221 are wound or folded.

Figure 15:
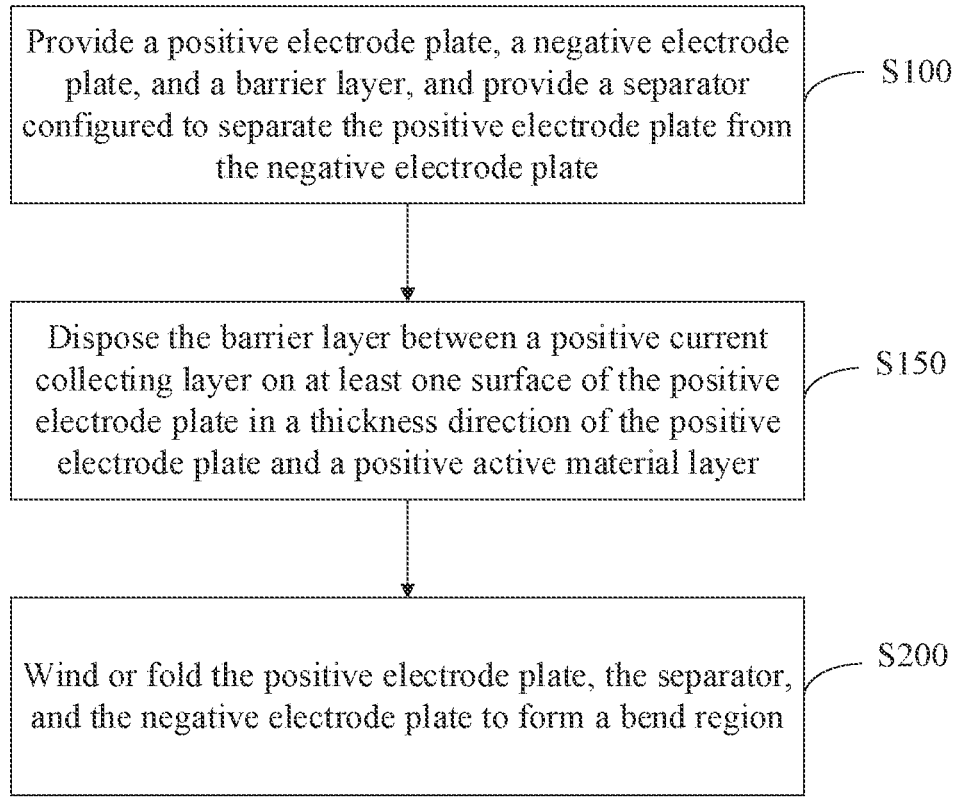
FIG. 15 is a flowchart of a method for manufacturing an electrode assembly according to still other embodiments of this disclosure.

In some embodiments, referring to FIG. 15, FIG. 15 is a flowchart of a method for manufacturing an electrode assembly 22 according to still other embodiments of this disclosure. The method includes: providing a separator 224 configured to separate the positive electrode plate 222 from the negative electrode plate 221, winding or folding the positive electrode plate 222, the separator 224, and the negative electrode plate 221 to form the bend region A.

It needs to be noted that, for the related structures of the electrode assemblies 22 manufactured according to the foregoing method for manufacturing an electrode assembly 22, refer to the descriptions of the electrode assemblies 22 provided in the foregoing embodiments.

Figure 16:
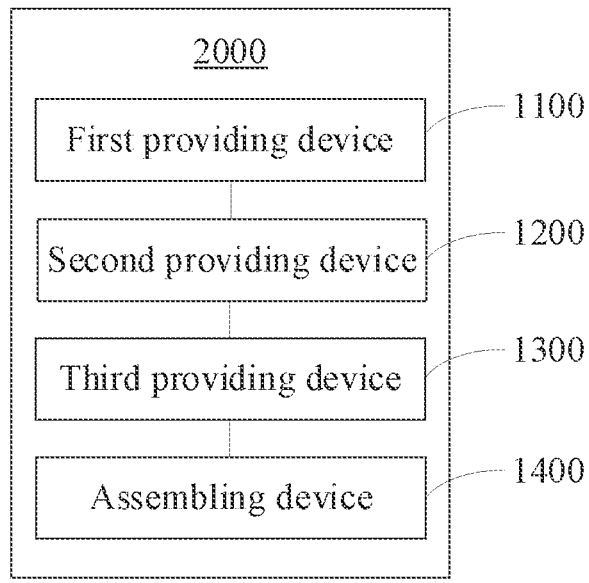
FIG. 16 is a schematic block diagram of a device for manufacturing an electrode assembly according to some embodiments of this disclosure.

Referring to FIG. 16, FIG. 16 is a schematic block diagram of a device 2000 for manufacturing an electrode assembly 22 according to some embodiments of this disclosure. The manufacturing device 2000 includes: a first providing device 1100, a second providing device 1200, a third providing device 1300, and an assembling device 1400.

The first providing device 1100 is configured to provide a positive electrode plate 222. The second providing device 1200 is configured to provide a negative electrode plate 221. The third providing device 1300 is configured to provide a barrier layer 223. The assembling device 1400 is configured to wind or fold the positive electrode plate 222 and the negative electrode plate 221 to form a bend region A.

The positive electrode plate 222 includes a plurality of bend portions 2220 located in the bend region A. Each bend portion 2220 includes a positive current collecting layer 2220a and a positive active material layer 2220b. The positive current collecting layer 2220a is coated with the positive active material layer 2220b on at least one surface in a thickness direction of the positive electrode plate 222.

A barrier layer 223 is disposed between the positive current collecting layer 2220a and the positive active material layer 2220b. The barrier layer 223 is configured to prevent electron transport between the positive current collecting layer 2220a and the positive active material layer 2220b.

In some embodiments, the manufacturing device 2000 further includes a fourth providing device (not shown in the drawing). The fourth providing device is configured to provide a separator 224 that separates the positive electrode plate 222 from the negative electrode plate 221. The assembling device 1400 is configured to wind or fold the positive electrode plate 222, the separator 224, and the negative electrode plate 221 to form a bend region A.

Although this disclosure has been described with reference to exemplary embodiments, various improvements may be made to the embodiments without departing from the scope of this disclosure, and the components of this disclosure may be replaced with equivalents. Particularly, to the extent that no structural conflict exists, various technical features mentioned in various embodiments can be combined in any manner. This disclosure is not limited to the specific embodiments disclosed herein, but includes all technical solutions falling within the scope of the claims.

What is claimed is:

1. An electrode assembly comprising: a positive electrode plate and a negative electrode plate, wherein:
    the positive electrode plate and the negative electrode plate are wound or folded to form a bend region, wherein
    the positive electrode plate comprises a plurality of bend portions located in the bend region, wherein each bend portion comprises a positive current collecting layer, a positive active material layer and a barrier layer, wherein:
    the positive current collecting layer is coated with the positive active material layer on at least one surface in a thickness direction of the positive electrode plate, and
    the barrier layer is disposed between the positive current collecting layer and the positive active material layer, wherein the barrier layer is configured to prevent electron transport between the positive current collecting layer and the positive active material layer;
    the barrier layer is an insulation layer;
    wherein both ends of the barrier layer extending along a bending direction of the bend portion are located in the bend region; or
    wherein the electrode assembly comprises a straight region connected to the bend region; and
        both ends of the barrier layer extending along a bending direction of the bend portion are located in the straight region; or
        one end of the barrier layer extending along a bending direction of the bend portion is located in the straight region, and the other end is located in the bend region.

2. The electrode assembly according to claim 1, wherein the positive current collecting layer is coated with the positive active material layer on an inner side in the thickness direction, and the barrier layer is disposed between the positive active material layer located on the inner side and the positive current collecting layer in at least one bend portion.

3. The electrode assembly according to claim 1, wherein the positive current collecting layer is coated with the positive active material layer on an outer side in the thickness direction, and the barrier layer is disposed between the positive active material layer located on the outer side and the positive current collecting layer in at least one bend portion.

4. The electrode assembly according to claim 1, wherein the positive current collecting layer is coated with the positive active material layer on both an inner side and an outer side in the thickness direction, and the barrier layer is disposed between the positive active material layer located on the inner side and the positive current collecting layer, and between the positive active material layer located on the outer side and the positive current collecting layer, in at least one bend portion.

5. The electrode assembly according to claim 1, wherein the positive electrode plate and the negative electrode plate are wound to form a jelly-roll structure, and the jelly-roll structure comprises the bend region having an innermost electrode plate; and
    the innermost electrode plate in the bend region is the negative electrode plate, and the barrier layer is disposed in an innermost bend portion of the bend region.

6. The electrode assembly according to claim 1, wherein one end or two ends of the barrier layer extending along a first direction do not exceed the positive active material layer, the first direction being perpendicular to a bending direction of the bend region;

wherein each bend portion further comprises a plurality of discrete barrier layers, wherein the plurality of barrier layers are spaced out along a bending direction of the bend region, or the plurality of the barrier layers are spaced out along a first direction, and the first direction is perpendicular to the bending direction of the bend region.

7. The electrode assembly according to claim 1, wherein one surface of the barrier layer is attached to the positive current collecting layer, and the other surface is attached to the positive active material layer;

wherein the barrier layer comprises at least one of an insulation adhesive layer, a ceramic insulation layer, or insulation tape.

8. The electrode assembly according to claim 7, characterized in that constituents of the insulation adhesive layer comprise at least one of styrene-butadiene rubber, polyacrylate, polyvinyl chloride, polyvinylidene difluoride, poly (vinylidene fluoride-co-hexafluoropropylene), epoxy resin, poly(butadiene-co-acrylonitrile), polyurethane rubber, polymethyl acrylate, or polyethyl acrylate.

9. The electrode assembly according to claim 7, characterized in that two surfaces of the insulation adhesive layer are bonded to the positive current collecting layer and the positive active material layer respectively.

10. The positive electrode plate according to claim 7, wherein the ceramic insulation layer is a mixture of ceramic particles and a polymer binder; and the ceramic particles comprise at least one of aluminum oxide, titanium oxide, barium sulfate, or zirconium oxide; and constituents of the polymer binder comprise at least one of styrene-butadiene rubber, polyacrylate, polyvinyl chloride, polyvinylidene difluoride, poly(vinylidene fluoride-co-hexafluoropropylene), epoxy resin, poly(butadiene-co-acrylonitrile), polyurethane rubber, polymethyl acrylate, or polyethyl acrylate; wherein a substrate material of the insulation tape is polyethylene terephthalate, polyvinyl chloride, polyethylene, or oriented polypropylene.

11. A battery cell, wherein the battery cell comprises a shell and the electrode assembly according to claim 1; and
the electrode assembly is accommodated in the shell.

12. A battery, wherein the battery comprises a box and the battery cell according to claim 11; and
the battery cell is accommodated in the box.

* * * * *